US009890832B2

(12) United States Patent
Kurth et al.

(10) Patent No.: US 9,890,832 B2
(45) Date of Patent: Feb. 13, 2018

(54) CYCLOIDAL PLANETARY GEAR SPEED REDUCER

(71) Applicant: Schaeffler Technologies AG & Co. KG, Herzogenaurach (DE)

(72) Inventors: Franz Kurth, Nuremberg (DE); Ralph Schimpf, Fuerth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/316,332

(22) PCT Filed: Mar. 31, 2015

(86) PCT No.: PCT/DE2015/200231
§ 371 (c)(1),
(2) Date: Dec. 5, 2016

(87) PCT Pub. No.: WO2016/004934
PCT Pub. Date: Jan. 14, 2016

(65) Prior Publication Data
US 2017/0175853 A1    Jun. 22, 2017

(30) Foreign Application Priority Data
Jul. 7, 2014  (DE) .................. 10 2014 213 149

(51) Int. Cl.
*F16H 1/32*      (2006.01)
*F16H 35/00*     (2006.01)
*F16H 49/00*     (2006.01)

(52) U.S. Cl.
CPC ......... *F16H 1/32* (2013.01); *F16H 2001/327* (2013.01); *F16H 2035/003* (2013.01); *F16H 2049/008* (2013.01)

(58) Field of Classification Search
None
See application file for complete search history.

(56) References Cited

U.S. PATENT DOCUMENTS

| | | | | |
|---|---|---|---|---|
| 5,211,611 A | * | 5/1993 | Lammers | F04B 9/04 |
| | | | | 475/178 |
| 5,433,672 A | * | 7/1995 | Tanaka | F16H 1/32 |
| | | | | 475/178 |
| 8,814,737 B2 | * | 8/2014 | Ishizuka | B60B 27/0073 |
| | | | | 180/65.6 |

FOREIGN PATENT DOCUMENTS

| | | |
|---|---|---|
| AT | 509468 A4 | 9/2011 |
| DE | 19518160 A1 | 4/1996 |
| DE | 19709020 A1 | 11/1997 |
| DE | 10127676 A1 | 12/2002 |

* cited by examiner

*Primary Examiner* — Colby M Hansen
(74) *Attorney, Agent, or Firm* — Simpson & Simpson, PLLC

(57) ABSTRACT

The invention relates to a cycloidal planetary gear speed reducer having a central shaft, comprising at least one ring gear disposed so as to be rigidly mounted in a housing, a set of planet gears in mesh with the ring gear, a rotatably supported planet gear carrier, on which the planet gears are mounted, and a plurality of drive plates arranged axially one behind the other in order to drive the planet gears, wherein the drive plates are mounted eccentrically on the central shaft in order to execute a circular translation movement, wherein at any given time during execution of a circular translation movement, the drive plates are in engagement with at least two planet gears.

7 Claims, 4 Drawing Sheets

CYCLOIDAL PLANETARY GEAR SPEED REDUCER

CROSS-REFERENCE TO RELATED APPLICATIONS

The present application is the U.S. National Stage Application pursuant to 35 U.S.C. §371 of International Patent Application No. PCT/DE2015/200231, filed on Mar. 31, 2015, and claims priority to German Patent Application No. DE 10 2014 213 149.9 of Jul. 7, 2014, which applications are incorporated by reference in their entireties.

FIELD

The invention relates to a cycloidal planetary gear speed reducer.

BACKGROUND

A cycloidal planetary gear speed reducer of this type is known from the German patent DE 195 18 160 A1. In the cycloidal planetary gear speed reducer there are drive plates, instead of a sun gear, for driving the planet gears, where in this case the drive plates perform a circular translation with respect to the planet gears. The drawback with this design is the complicated and space intensive assembly. In addition, when the drive plates are executing a circular translation movement, an inaccurate engagement of these drive plates with the planet gears may lead to noises, an increase in friction and malfunctions.

SUMMARY

Therefore, the object of the present invention is to provide a cycloidal planetary gear speed reducer of the aforementioned type, which ensures an effective and reliable operation and is easy to assemble.

Proposed is a cycloidal planetary gear speed reducer comprising a central shaft, at least one ring gear disposed so as to be rigidly mounted in a housing, a set of planet gears in mesh with the ring gear and a plurality of drive plates arranged axially one behind the other for driving the planet gears, wherein in order to perform a circular translation movement, the drive plates are mounted eccentrically on the central shaft. As a result, at any given time during the execution of a circular translation movement the drive plates are in engagement with at least two planet gears. Therefore, in order to engage with three planet gears, the drive plates form in each case three concave circular arc-shaped tooth segments, which correspond with these three planet gears and which have internal gear teeth on the outer periphery, with said internal gear teeth having an opening angle that is greater than 180 degrees. Another possibility is that in order to engage with four planet gears, the drive plates form in each case four concave circular arc-shaped tooth segments, which correspond with these four planet gears and which have internal gear teeth on the outer periphery, with said internal gear teeth having an opening angle that is greater than 150 degrees. This arrangement ensures that at any given time the drive plates have two points of engagement with respect to the planet gears; and, as a result, their movement is completely defined, so that an exact guidance of the drive plates on the planet gears is ensured and at the same time a simple design of the transmission is made possible. In this way malfunctions are avoided, and an effective operation of the cycloidal planetary gear speed reducer is ensured.

An additional preferred embodiment of the invention provides that in order to engage with the planet gears, the drive plates form in each case concave circular arc-shaped tooth segments having internal gear teeth on the outer periphery. In this case the internal gear teeth of the tooth segments, which follow one another in succession in the circumferential direction, exhibit a tooth offset, which is a function of the respective position of the tooth segments, by a predetermined angle with respect to each other. The tooth offset makes it possible to achieve an exact tooth mesh between the planet gears and the tooth segments. As a result, friction, wear, and a self-locking in the cycloidal planetary gear speed reducer can be easily reduced.

In this context the tooth offset of the internal gear teeth of the tooth segments, following one another in succession in the circumferential direction, is preferably determined by an angle that is a function of the respective position of the tooth segments, the tooth count of the first ring gear, the tooth count of the internal gear teeth of the tooth segments, the number of planet gears and the gear ratio between the drive plates and the first ring gear. Thus, the angle is determined preferably by $$\delta_j[*](Z_{H1}/Z_{Ex})*(360°/P_{Anz})*(1/(j_1-1)),$$

where $j=0, 1, 2 \ldots P_{Anz}-1$ denotes the respective position of the planet gears, $\delta_0=0°$ denotes the angular tooth offset of the tooth segment at the starting point, $Z_{H1}$ denotes the tooth count of the first ring gear, $Z_{Ex}$ denotes the tooth count of the tooth segments based on an imaginary ring gear, $$j_1=1-(1/(1+Z_{Ex}/Z_P))[*](-Z_{H1}/Z_P)$$

$Z_P$ denotes the tooth count of the planet gears and $P_{Anz}$ denotes the number of planet gears.

Furthermore, it is advantageous if in order to engage with the planet gears, the drive plates exhibit a predetermined opening angle at the respective tooth segments. As a result, the arrangement of the drive plates in engagement with the planet gears is further optimized. At the same time the forces acting in mesh, the noises and the self-locking are reduced.

Preferably the opening angle is determined as a function of the number of planet gears, the length of the mesh line of action from its entry point up to its pitch point between the external gear teeth of the planet gears and the internal gear teeth of the tooth segments and as a function of the tip circle diameter and the pitch circle diameter of the internal gear teeth of the tooth segments. Therefore, the following holds preferably for the opening angle y $$y=2*\{360°/P_{Anz}-\cos^{-1}[(AC^2-(d_{aex}/2)^2-(d_{wex}/2)^2)*(-2/(d_{wex}*d_{aex})]\}$$

where $P_{Anz}$ denotes the number of planet gears,

AC denotes the mesh line of action from its entry point up to its pitch point between the gear teeth of the planet gears and the internal gear teeth of the tooth segments, $d_{aex}$ denotes the tip circle diameter of the internal gear teeth of the tooth segments and $d_{wex}$ denotes the pitch circle diameter of the internal gear teeth of the tooth segments.

Another preferred embodiment of the invention provides that in order to engage with three planet gears, the drive plates may form in each case three concave circular arc-shaped tooth segments, which correspond with these three planet gears and which have internal gear teeth on the outer periphery. In each case the internal gear teeth exhibit an opening angle that is greater than 180 degrees. Also conceivable is an arrangement with four planet gears and at least two drive plates, each having four tooth segments in order to mesh with the planet gears. In this case the opening angle of the internal gear teeth of the tooth segments is reduced accordingly. However, this opening angle is preferably greater than 150 degrees.

In order to reduce the mass or, more specifically, the weight, the drive plates may have in the circumferential direction recesses between the tooth segments on the outer periphery. As an alternative or in addition, through-holes may be provided radially inwards in a radially central region between the outer periphery and a central receiving opening.

The drive plates are made preferably of sheet metal and can be very easy to manufacture by punching.

It is particularly advantageous if the cycloidal planetary gear speed reducer of the invention is used, for example, in servo drives with high gear ratios and without self-locking.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
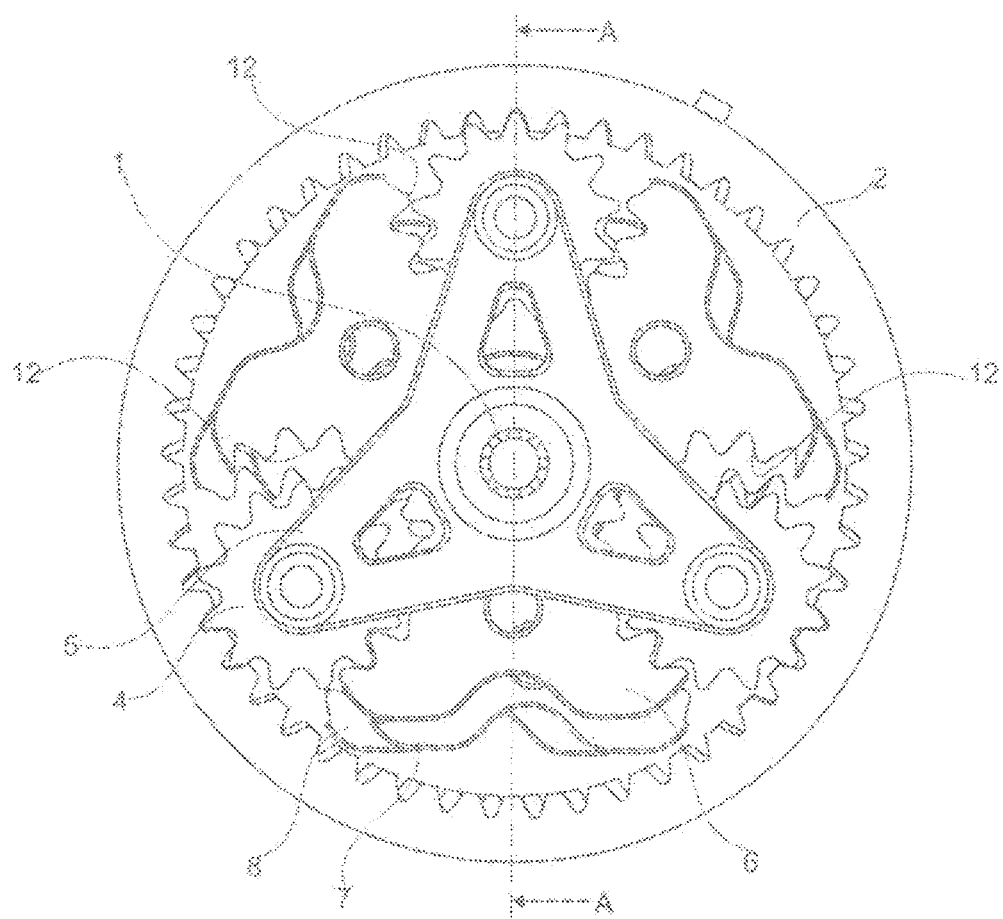
FIG. 1 is a side view of a cycloidal planetary gear speed reducer according to the invention.
Figure 2:
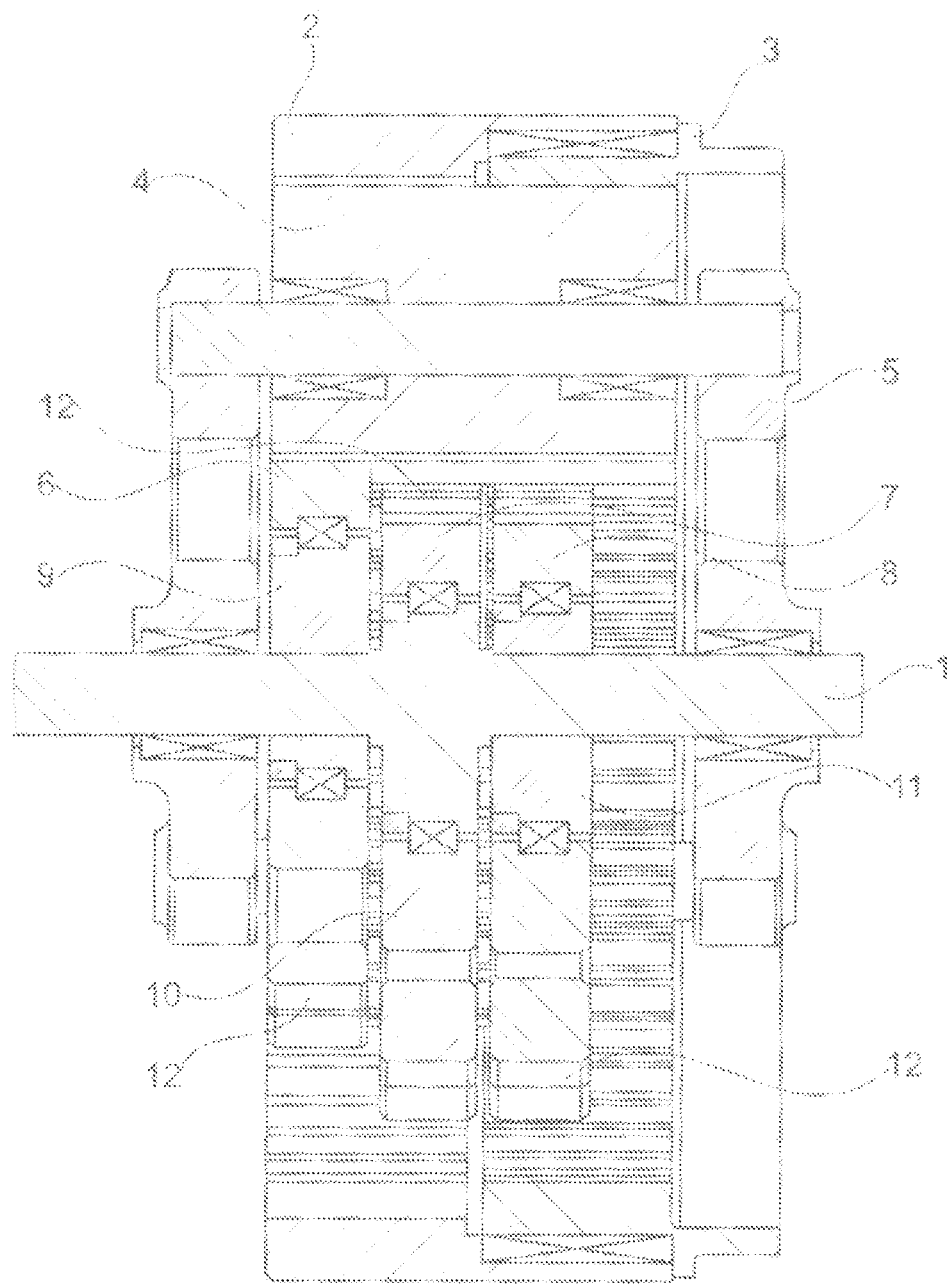
FIG. 2 is a sectional view of the cycloidal planetary gear speed reducer.

FIG. 1 shows one example of an inventive cycloidal planetary gear speed reducer, as shown in FIG. 2 in a longitudinal sectional view taken along the line A-A from FIG. 1 The cycloidal planetary gear speed reducer has two ring gears 2, 3, arranged one behind the other in succession so as to be coaxial to central shaft 1, and set of planet gears 4, which are mounted on planet gear carrier 5 and which in turn are centrally supported, in the present case on the central shaft 1, in a manner allowing rotation. Planet gears 4 are in mesh with the ring gears 2, 3 and at the same time can be driven by so-called drive plates 6, 7, 8. These drive plates are axially disposed one behind the other by means of the associated eccentrics 9, 10, 11 on central shaft 1. Drive plates 6, 7, 8 are radially supported by means of a rolling bearing on the associated eccentrics 9, 10, 11 and at the same time can also be axially fixed to these eccentrics. Alternatively, drive plates 6, 7, 8 can also be radially mounted in a sliding bearing. Eccentrics 9, 10, 11 are connected to central shaft 1 in a rotationally and axial fixed manner. When central shaft 1 rotates, drive plates 6, 7, 8 move on orbits that are eccentric to central shaft 1. In this case said drive plates execute a so-called circular translation movement. Therefore, a rotation of drive plates 6, 7, 8 around their own axis, in particular, a rotation relative to planet gear carrier 5, is avoided.

First ring gear 2, which encloses radially outwards planet gears 4 and drive plates 6, 7, 8, is disposed to be rotationally fixed or rigidly mounted in the housing, while second ring gear 3 is rotatably mounted coaxially to the first ring gear. Thus, planet gears 4 mesh with the internal gear teeth of first ring gear 2 at a first axial section of their external gear teeth and with the internal gear teeth of second ring gear 3 at a second axial section of their external gear teeth. Thus the external gear teeth of planet gears 4 are designed to be axially continuous without interruption. Second ring gear 3 is used simultaneously as the output.

All of drive plates 6, 7, 8 are identical in design and are used to drive planet gears 4. Each of the drive plates has on its outer periphery a number of circular arc-shaped concave tooth segments 12 that correspond to number of planet gears 4, in order to engage with corresponding planet gear 4. In this case each tooth segment 12 is associated with planet gear 4. When central shaft 1 rotates, drive plates 6, 7, 8 come into engagement, upon execution of their circular translation movement, in an alternating manner with the respective associated planet gears 4 at their tooth segments 12 and, in so doing, push these planet gears at their respective external gear teeth further by at least one tooth. Therefore, at any given time during its circular translation movement, each drive plate 6, 7, 8 is in engagement with a respective planet gear 4 at at least two tooth segments 12.

The cycloidal planetary gear speed reducer consists of two gear stages. In this case drive plates 6, planet gears 4 and first ring gear 2, 7, 8 form the first gear stage. Attached thereto, the second gear stage, consisting of planet gears 4, is in engagement with second ring gear 3. The second gear stage forms a so-called plus gear set, in which second ring gear 3 and planet gear carrier 5 rotate in the same direction.

First partial gear ratio $j_1$ with respect to the first gear stage between drive plates 6, 7, 8 and first ring gear 2 is determined by means of tooth count $Z_{H1}$ of the internal gear teeth of first ring gear 2, tooth count $Z_P$ of the gear teeth of planet gears 4 and tooth count $Z_{EX}$ of tooth segments 12 on drive plates 6, 7, 8. Hence, it holds that $$j_t = 1 - (1/(1+Z_{Ex}/Z_P)) + (-Z_{H1}/Z_P)$$

Tooth count $Z_{Ex}$ relates to the internal gear teeth of a ring gear that is formed virtually on tooth segments 12. First partial gear ratio $j_1$ is determined, based on the predetermined tooth count $Z_{H1}$ of first ring gear 2, by means of the difference between tooth count $Z_{Ex}$ of tooth segments 12 and tooth count $Z_P$ of planet gears 4.

Second partial gear ratio $j_2$ with respect to the second gear stage is determined by means of tooth count $Z_{H1}$ of the internal gear teeth of first ring gear 1, tooth count $Z_P$ of the external gear teeth of planet gears 4 and tooth count $Z_{H2}$ of the internal gear teeth of second ring gear 3. Hence, it follows that $$j_2=1/((1-1/(-Z_{H1}/Z_P)-1)*(-Z_{H2}/Z_P)+1)$$

First partial gear ratio $j_1$ is preferably greater than second partial gear ratio $j_2$:

$$j_1 > j_2$$

where tooth count $Z_{H1}$ of first ring gear 2 is smaller than tooth count $Z_{H2}$ of second ring gear 3:

$$Z_{H1} < Z_{H2}$$

In addition, there is a large difference between tooth counts $Z_{H1}$, $Z_{H2}$ of ring gears 2, 3 respectively. This difference is made possible by means of a corresponding addendum modification or the reference profiles at the internal gear teeth of ring gears 2, 3. By dividing the partial gear ratios, where $j_1>j_2$, into the gear stages with the largest possible difference in tooth counts $Z_{H1}$, $Z_{H2}$ of ring gears 2, 3 it is possible to avoid or almost avoid a self-locking in the cycloidal planetary gear speed reducer not only at speed step-up ratios but also at speed step-down ratios. At the same time a large overall gear ratio j is achieved between central shaft 1 and second ring gear 3, where $j=j_1*j_2>200$. That being the case, central shaft 1 and second ring gear 3 rotate in the same direction.

The cycloidal planetary gear speed reducer has, for example, three planet gears 4 and three drive plates 6, 7, 8, which are arranged axially one behind the other in succession, with three associated eccentrics 9, 10, 11. It is also conceivable to arrange, depending on the torque to be transmitted and the number of planet gears 4, more or less drive plates 6, 7, 8 or eccentrics 9, 10, 11. For example, it is possible to provide four planet gears 4, which are in engagement with at least two drive plates 6, 7, 8.

On central shaft 1, each one of the axially outwards disposed eccentrics 8, 10 is designed as a separate component, whereas eccentric 10, which is disposed in the middle between outer eccentrics 9, 11, is formed in one piece with central shaft 1. Eccentrics 9, 10, 11 are arranged on central shaft 1 in the circumferential direction in such a way that they are offset from each other by an angle of 120 degrees. As a result, drive plates 6, 7, 8 move, as a function of the angular offset of eccentrics 9, 10, 11, out of phase with each other. Thus, central shaft 1 and eccentrics 9, 10, 11 form a so-called eccentric shaft.

Planet gear carrier 5 is rotatably mounted in a rolling bearing on the central shaft 1 at the parallel side wall sections. Between the side wall sections, three planet gears 4 are mounted on three pins, which are supported at their ends on the side wall sections. Each of the side wall sections is made of three struts, the free end sections of which receive the pins externally. The three struts converge centrally in the shape of a star, in order to form there a bearing eye in order to mount on central shaft 1. Each of the struts comprises a recess in order to reduce the mass or, or more specifically, the weight.

First ring gear 2 is mounted radially on second ring gear 3. For this purpose ring gears 2, 3 are arranged so as to overlap at their axial end sections, which face each other. In order to receive the bearing, the end section of first ring gear 2 is widened at its inside diameter at a first annular shoulder, whereas the end section of second ring gear 3 exhibits a corresponding second annular shoulder with a retracted outer diameter. A rolling bearing is fitted axially and radially between the annular shoulders. On its end section, which faces away from first ring gear 2, second ring gear 3 encloses radially outwards a side wall section of planet gear carrier 11. At first ring gear 2 the internal gear teeth are defined axially inwards by the first annular shoulder.

Figure 3:
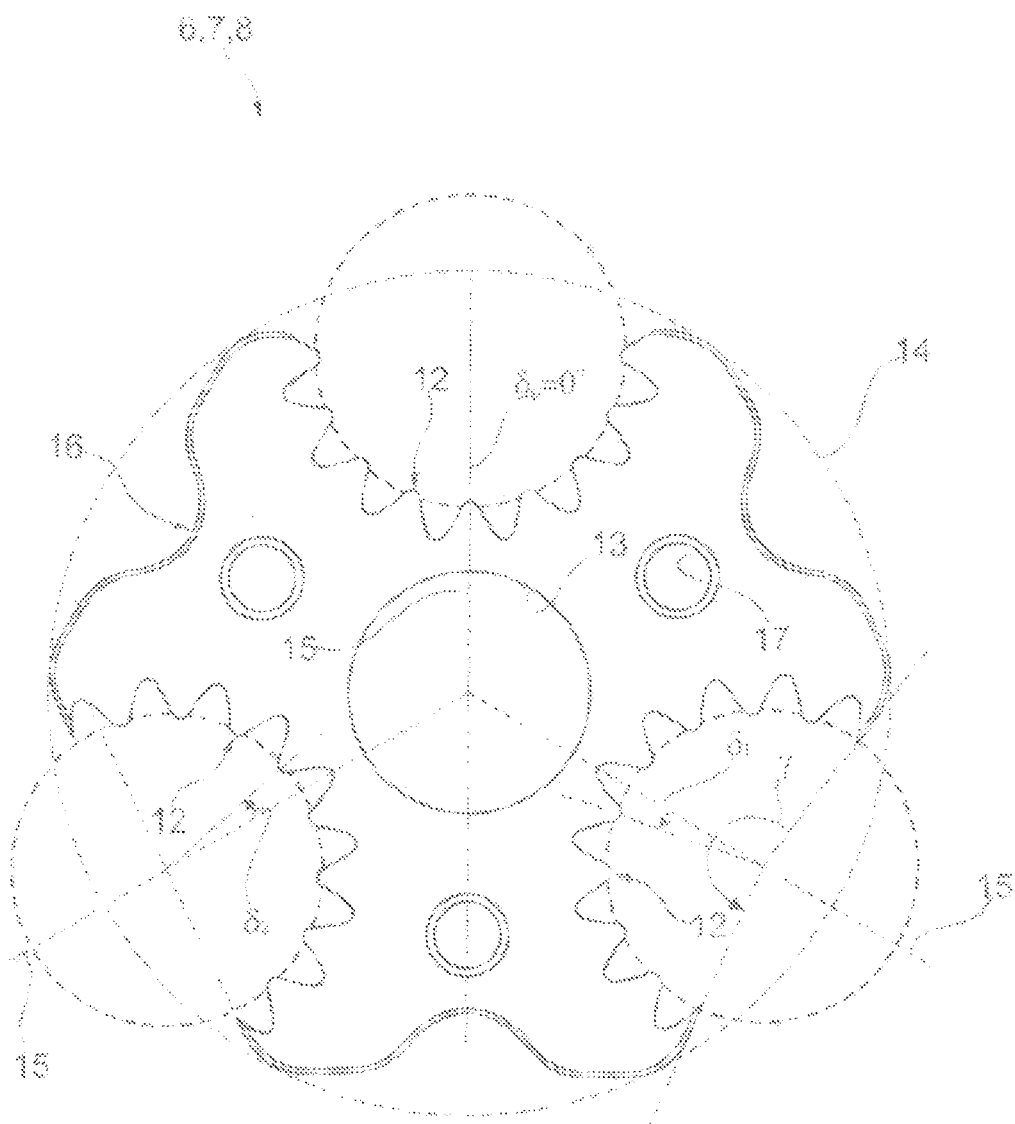
FIG. 3 is a detail view of a drive plate according to the invention.

FIG. 3 shows the embodiment of drive plate 6, 7, 8, which can be mounted on eccentrics 9, 10, 11 of central shaft 1 at central circular receiving opening 13. At the same time the center point of receiving opening 13 forms the center point of imaginary circular line 14, which encompasses the drive plate on the outer periphery. Three circular arc-shaped tooth segments 12 are provided, as concave indentations on the outer periphery, with internal gear teeth for engagement with a respective planet gear 4. Tooth segments 12 are arranged on central axes 15 in such a way that they are offset by 120 degrees from one another. Central axes 15 pass through the geometric center points of circular arc-shaped tooth segments 12 and through the center point of the drive plate 6, 7, 8. The central axes form simultaneously the axes of symmetry, to which drive plate 6, 7, 8 is designed so as to be axially symmetrical.

In order to optimize the meshing of the teeth between planet gears 4 and tooth segments 12, the internal gear teeth of the latter exhibit a tooth offset by predetermined angle $\delta_j$ with respect to each other. Angle $\delta_j$ is based on central axis 15 of respective tooth segment 12. Starting from tooth segment 12 at position j=0, said angle is determined as a function of respective position j, at each of tooth segments 12 that follow one behind the other in succession in the circumferential direction of drive plates 6, 7, 8. Index j runs from 0, 1, . . . to $P_{Anz}-1$, where $P_{Anz}$ stands for the number of planet gears 4, and $\delta_0=0°$ stands for the angle of the internal gear teeth of tooth segment 12 at the starting point at planet gear position j=0. At each drive plate 6, 7, 8, the internal gear teeth of the successive tooth segments 12 are designed as a function of the respective position j of tooth segment 12, tooth count $Z_{H1}$ of first ring gear 2, tooth count $Z_{Ex}$ of the internal gear teeth of tooth segments 12, number n of planet gears 4 and as a function of first partial gear ratio $j_1$ in such a way that said internal gear teeth are offset by angle $\delta_j$, which is determined by means of $$\delta_j=j*(Z_{H1}/Z_{Ex})*(360°/P_{Anz})*(1/(j_1-1)).$$

In the exemplary embodiment the tooth offset of tooth segment 12, which is arranged at planet gear position j=0, is $\delta_0=0°$. For example, in the present case tooth segments 12, which follow in the rolling direction in the clockwise direction at the planet gear positions j=1 and j=2, exhibit a tooth offset by angle $\delta_1=10°$ or $\delta_2=20°$ at their internal gear teeth with respect to tooth segment 12, arranged at planet gear position j=0.

Figure 4:
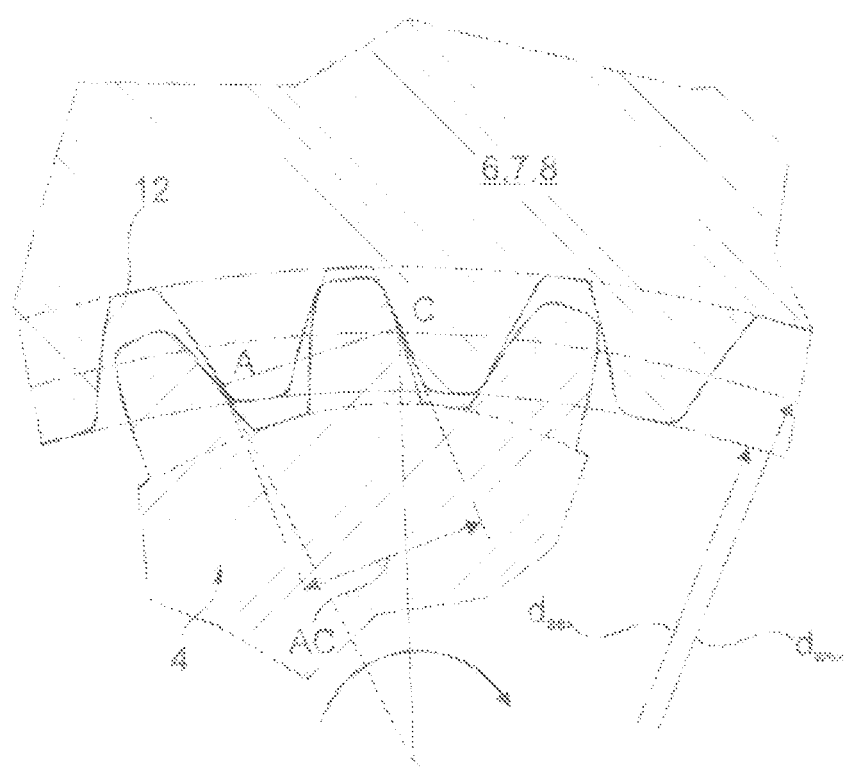
FIG. 4 is an enlarged partial view of a drive plate in engagement with a planet gear.

Furthermore, tooth segments 12 are designed so as to exhibit a predetermined opening or looping angle y. This angle determines the arc length of tooth segments 12. That being the case, planet gears 4 can roll on this arc length in mesh with tooth segments 12. In so doing, drive plate 6, 7, 8 behaves like an imaginary ring gear, which is indicated by a dashed circular line, at its respective tooth segments 12. This feature allows each of tooth segments 12 to form a partial ring gear or, more specifically, a subsection of an imaginary ring gear. FIG. 4 shows in schematic form an enlarged detail of drive plate 6, 7, 8 in engagement with planet gear 4 at a tooth segment 12. Opening angle y determines the length and duration of the engagement of planet gears 4 with drive plate 6, 7, 8 during one full turn. Said opening angle is configured in such a way that at any given time during the circular translation movement of the drive plate, drive plate 6, 7, 8 is in mesh with respective planet gear 4 at at least two tooth segments 12. As a result, drive plate 6, 7, 8 is arranged in a defined manner at any given time of its movement. For this purpose the opening angle y is designed as a function of the number $P_{Anz}$ of planet gears 4 to be driven, the length of the mesh line of action AC from entry point A up to the pitch point C between the external gear teeth of planet gears 4 and the internal gear teeth of tooth segments 12, the tip circle diameter $d_{aex}$ and the pitch circle diameter $d_{wex}$ of the internal gear teeth of tooth segments 12 (FIG. 4). Therefore, it holds that $$y=2*\{360°/P_{Anz}-\cos^{-1}[(AC^2-(d_{aex}/2)^2-(d_{wex}/2)^2)*(-2/(d_{wex}*d_{aex}))]\}$$

In the exemplary embodiment the internal gear teeth of tooth segments 12 are designed so as to exhibit an opening angle y of about 200 degrees.

In order to reduce the mass or, more specifically, the weight of drive plate 6, 7, 8, recesses 16 are provided in the circumferential direction between tooth segments 12 on the outer periphery (FIG. 3), with each recess forming a concave arc-shaped curvature. In order to reduce the mass or, more specifically, the weight even more, circular through-holes 17 are formed in a radially central region between recesses 16 radially outwards and receiving openings 13 radially inwards.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE LABELS 1 central shaft
2 ring gear
3 ring gear
4 planet gear
5 planet gear carrier
6 drive plate
7 drive plate
8 drive plate
9 eccentric
10 eccentric
11 eccentric
12 tooth segment
13 receiving opening
14 circular line
15 central axis
16 recess
17 through-hole
δ angle
y opening angle
AC mesh line of action
A entry point
C pitch point
$d_{aex}$ tip circle diameter
$d_{wex}$ pitch circle diameter

What is claimed is:

1. A cycloidal planetary gear speed reducer having a central shaft, comprising:
    at least one ring gear disposed so as to be rigidly mounted in a housing,
    a set of planet gears in mesh with the at least one ring gear,
    a rotatably supported planet gear carrier, on which the planet gears are mounted, and
    a plurality of drive plates arranged axially, one behind the other, in order to drive the planet gears, wherein the drive plates are mounted eccentrically on the central shaft in order to execute a circular translation movement, wherein at any given time during execution of a circular translation movement, the drive plates are in engagement with at least two planet gears, wherein in order to engage with three planet gears, the drive plates form in each case three concave circular arc-shaped tooth segments, which correspond with said three planet gears and which have internal gear teeth on the outer periphery, with said internal gear teeth having an opening angle that is greater than 180 degrees; or in order to engage with four planet gears, the drive plates form in each case four concave circular arc-shaped tooth segments, which correspond with these four planet gears and which have internal gear teeth on the outer periphery, with said internal gear teeth having an opening angle that is greater than 150 degrees.

2. The cycloidal planetary gear speed reducer of claim 1, wherein the drive plates form, in each case, concave circular arc-shaped tooth segments having internal gear teeth on the outer periphery, wherein the internal gear teeth of the tooth segments, which follow one another in succession in the circumferential direction, exhibit a tooth offset, which is a function of the respective position of the tooth segments, by a predetermined angle with respect to each other.

3. The cycloidal planetary gear speed reducer of claim 2, wherein the tooth offset of the internal gear teeth of the tooth segments, which follow one another in succession in the circumferential direction, is determined by means of an angle that is a function of the respective position of the tooth segments, the tooth count of the first ring gear, the tooth count of the internal gear teeth of the tooth segments, the number of planet gears and the gear ratio between the drive plates and the ring gear.

4. The cycloidal planetary gear speed reducer of claim 1, wherein the drive plates form, in each case, concave circular arc-shaped tooth segments having internal gear teeth on the outer periphery, with said internal gear teeth having, in each case, a predetermined opening angle that is determined as a function of the number of planet gears, the length of the mesh line of action from its entry point up to its pitch point between the external gear teeth of the planet gears and the internal gear teeth of the tooth segments and as a function of the tip circle diameter and the pitch circle diameter of the internal gear teeth of the tooth segments.

5. The cycloidal planetary gear speed reducer of claim 1, wherein the drive plates have in the circumferential direction recesses between the tooth segments on the outer periphery.

6. The cycloidal planetary gear speed reducer of claim 1, wherein the drive plates have through-holes in a radially central region between the recesses on the outer periphery and a central receiving opening radially inwards.

7. The cycloidal planetary gear speed reducer of claim 1, wherein the drive plates are made of sheet metal and are manufactured by punching.

* * * * *